(12) United States Patent
Jang

(10) Patent No.: US 12,132,233 B2
(45) Date of Patent: Oct. 29, 2024

(54) FUEL CELL AND AUTOMOBILE INCLUDING THE SAME

(71) Applicants: Hyundai Motor Company, Seoul (KR); Kia Motors Corporation, Seoul (KR)

(72) Inventor: In Woo Jang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 852 days.

(21) Appl. No.: 17/079,008

(22) Filed: Oct. 23, 2020

(65) Prior Publication Data

US 2021/0288337 A1    Sep. 16, 2021

(30) Foreign Application Priority Data

Mar. 16, 2020  (KR) .................. 10-2020-0032208

(51) Int. Cl.
    *H01M 8/0258*  (2016.01)
    *H01M 8/0202*  (2016.01)
    *H01M 8/0245*  (2016.01)
    *H01M 8/1004*  (2016.01)

(52) U.S. Cl.
    CPC ....... *H01M 8/0258* (2013.01); *H01M 8/0202* (2013.01); *H01M 8/0245* (2013.01); *H01M 8/1004* (2013.01); *H01M 2250/20* (2013.01)

(58) Field of Classification Search
    CPC ............ H01M 8/0258; H01M 8/0202; H01M 8/0245; H01M 8/1004; H01M 2250/20; H01M 8/0206; H01M 8/10; Y02E 60/50; Y02T 90/40
    See application file for complete search history.

(56) References Cited

U.S. PATENT DOCUMENTS

| | | | | |
|---|---|---|---|---|
| 9,577,276 | B2 * | 2/2017 | Mitsuta | ............... H01M 8/0284 |
| 2002/0182466 | A1 * | 12/2002 | Walsh | ............... H01M 8/04007 |
| | | | | 429/413 |
| 2003/0077501 | A1 * | 4/2003 | Knights | ............ H01M 8/04089 |
| | | | | 429/435 |
| 2011/0014543 | A1 * | 1/2011 | Taniguchi | ........... H01M 8/1004 |
| | | | | 429/483 |
| 2012/0258383 | A1 * | 10/2012 | Utsunomiya | ....... H01M 8/0228 |
| | | | | 429/509 |
| 2014/0065494 | A1 * | 3/2014 | Fujita | .................... C25B 11/075 |
| | | | | 204/290.11 |

FOREIGN PATENT DOCUMENTS

| | | | |
|---|---|---|---|
| JP | 2005078975 A | * | 3/2005 |
| JP | 2006-134698 A | * | 5/2006 |

OTHER PUBLICATIONS

English translation JP2005078975A as taught by Kosako (Year: 2005).*
Machine translation of JP 206-134698A, published on May 25, 2006 (Year: 2006).*
"How does the thickness of metal plating affect its overall electrical resistance?", date unknown https://www.proplate.com/how-does-the-thickness-of-metal-plating-affect-its-overall-electrical-resistance/#:~:text=In%20summary%2C%20the%20thickness%20of,generally%20equating%20to%20lower%20resistance.*

* cited by examiner

*Primary Examiner* — Anca Eoff
(74) *Attorney, Agent, or Firm* — SLATER MATSIL, LLP

(57) ABSTRACT

A fuel cell includes a membrane electrode assembly including a membrane, a cathode, and an anode, a first gas diffusion layer stacked on an outer surface of the cathode, a second gas diffusion layer stacked on an outer surface of the anode, a separator stacked on an outer surface of the first gas diffusion layer, and a reaction gas channel provided in the separator, wherein the reaction gas channel includes an inlet region, an outlet region, and a central region provided between the inlet region and the outlet region with respect to a flow direction of a reaction gas flowing through the reaction gas channel, wherein an electric resistance of the separator in the inlet region or the outlet region is greater than an electric resistance of the separator in the central region.

13 Claims, 6 Drawing Sheets

FUEL CELL AND AUTOMOBILE INCLUDING THE SAME

CROSS-REFERENCE TO RELATED APPLICATIONS

This application claims the benefit of Korean Patent Application No. 10-2020-0032208, filed on Mar. 16, 2020, which application is hereby incorporated herein by reference.

TECHNICAL FIELD

Exemplary embodiments relate to a fuel cell and an automobile including the fuel cell.

BACKGROUND

Fuel cells, which generate electricity from a reaction between a fuel (for example, hydrogen) and air, generally include a membrane electrode assembly (MEA) including a membrane, an anode, and a cathode, a gas diffusion layer in which the fuel and air diffuse, and a separator. Among the constituents described above, the separator is configured to face each of the anode and the cathode and has roles in discharging, to the outside, water produced by a reaction inside a fuel cell while supplying fuel and air from the outside and in providing a path through which current generated by the reaction inside the fuel cell is able to flow.

Here, in the separator, each of an air channel serving as a path through which the air flows and a fuel channel serving as a path through which the fuel flows is provided. The air supplied to the separator flows through the air channel and is supplied to the MEA via the gas diffusion layer, and the fuel supplied to the separator flows through the fuel channel and is supplied to the MEA via the gas diffusion layer.

However, according to the related art, an upstream region, a central region, and a downstream region of the air channel or the fuel channel, with respect to a direction in which the air or fuel flows, have different reactivity, and thus, densities of current produced in the fuel cell are non-uniform depending on positions.

SUMMARY

Exemplary embodiments of the present disclosure reduce non-uniformity in current densities according to positions of a fuel cell and manufacture the fuel cell having uniform performance.

A first embodiment of the present disclosure provides a fuel cell including a membrane electrode assembly (MEA) including a membrane, a cathode, and an anode, a gas diffusion layer stacked on each of one surface of the cathode and one surface of the anode of the MEA, and a separator stacked on one surface of the gas diffusion layer, wherein a reaction gas channel, which serves as a path through which a reaction gas flows, is provided in the separator. The reaction gas channel includes an inlet region, an outlet region, and a central region provided between the inlet region and the outlet region with respect to a flow direction of the reaction gas flowing through the reaction gas channel, and electric resistance of the separator in the inlet region or the outlet region of the reaction gas channel is greater than electric resistance of the separator in the central region of the reaction gas channel.

A second embodiment of the present disclosure provides a fuel cell including a membrane electrode assembly (MEA) including a membrane, a cathode, and an anode, a gas diffusion layer stacked on each of one surface of the cathode and one surface of the anode of the MEA, and a separator stacked on one surface of the gas diffusion layer, wherein a reaction gas channel, which serves as a path through which a reaction gas flows, is provided in the separator. The reaction gas channel includes an inlet region, an outlet region, and a central region provided between the inlet region and the outlet region, with respect to a flow direction of the reaction gas flowing through the reaction gas channel, and electric resistance in a region of the gas diffusion layer, which is adjacent to the inlet region of the reaction gas channel, or electric resistance in a region of the gas diffusion layer, which is adjacent to the outlet region of the reaction gas channel, is greater than electric resistance in a region of the gas diffusion layer, which is adjacent to the central region of the reaction gas channel.

Each of the inlet region and the outlet region may be about 8% to about 12% of an overall length of the separator.

Each of the electric resistance of the separator in the inlet region and the outlet region of the reaction gas channel may be greater by about 8% to about 12% than the electric resistance of the separator in the central region of the reaction gas channel.

Each of the electric resistance in the region of the gas diffusion layer, which is adjacent to the inlet region of the reaction gas channel, and the electric resistance in the region of the gas diffusion layer, which is adjacent to the outlet region of the reaction gas channel, may be greater by about 8% to about 12% than the electric resistance in the region of the gas diffusion layer, which is adjacent to the central region of the reaction gas channel.

A thickness of the separator in the inlet region or the outlet region of the reaction gas channel may be less than a thickness of the separator in the central region of the reaction gas channel.

A metal layer may be provided on a surface of the separator in the central region of the reaction gas channel, and the metal layer may not be provided on at least a portion of a surface of the separator in the inlet region or the outlet region of the reaction gas channel.

An electrically insulating layer may be provided on a surface of the separator in the inlet region or the outlet region of the reaction gas channel.

An electrically insulating layer may be provided on a surface of the region of the gas diffusion layer, which is adjacent to the inlet region of the reaction gas channel, or on a surface of the region of the gas diffusion layer, which is adjacent to the outlet region of the reaction gas channel.

An electrically insulating layer may be provided within the region of the gas diffusion layer, which is adjacent to the inlet region of the reaction gas channel, or within the region of the gas diffusion layer, which is adjacent to the outlet region of the reaction gas channel.

The gas diffusion layer may include a base layer having a sheet shape, and a microporous layer stacked on one surface of the base layer, wherein the electrically insulating layer is provided between the base layer and the microporous layer or provided within the base layer.

The electric resistance of the separator in the inlet region of the reaction gas channel may be greater than the electric resistance of the separator in the outlet region of the reaction gas channel.

The electric resistance in the region of the gas diffusion layer, which is adjacent to the inlet region of the reaction gas channel, may be greater than the electric resistance in the region of the gas diffusion layer, which is adjacent to the outlet region of the reaction gas channel.

The reaction gas may be air, and the reaction gas channel may be an air channel.

A third embodiment of the present disclosure provides an automobile including a fuel cell, wherein the fuel cell includes a membrane electrode assembly (MEA) including a membrane, a cathode, and an anode, a gas diffusion layer stacked on each of one surface of the cathode and one surface of the anode of the MEA, and a separator stacked on one surface of the gas diffusion layer, wherein a reaction gas channel, which serves as a path through which a reaction gas flows, is provided in the separator. The reaction gas channel includes an inlet region, an outlet region, and a central region provided between the inlet region and the outlet region, with respect to a flow direction of the reaction gas flowing through the reaction gas channel, and (i) electric resistance of the separator in the inlet region or the outlet region of the reaction gas channel is greater than electric resistance of the separator in the central region of the reaction gas channel, or (ii) electric resistance in a region of the gas diffusion layer, which is adjacent to the inlet region of the reaction gas channel, or electric resistance in a region of the gas diffusion layer, which is adjacent to the outlet region of the reaction gas channel, is greater than electric resistance in a region of the gas diffusion layer, which is adjacent to the central region of the reaction gas channel.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATIVE EMBODIMENTS

Hereinafter, a fuel cell and an automobile including the fuel cell according to embodiments of the present disclosure will be described with reference to the accompanying drawings.
Fuel Cell FIG. 1 is a schematic side view illustrating a structure of a fuel cell according to embodiments of the present disclosure.

Figure 1:
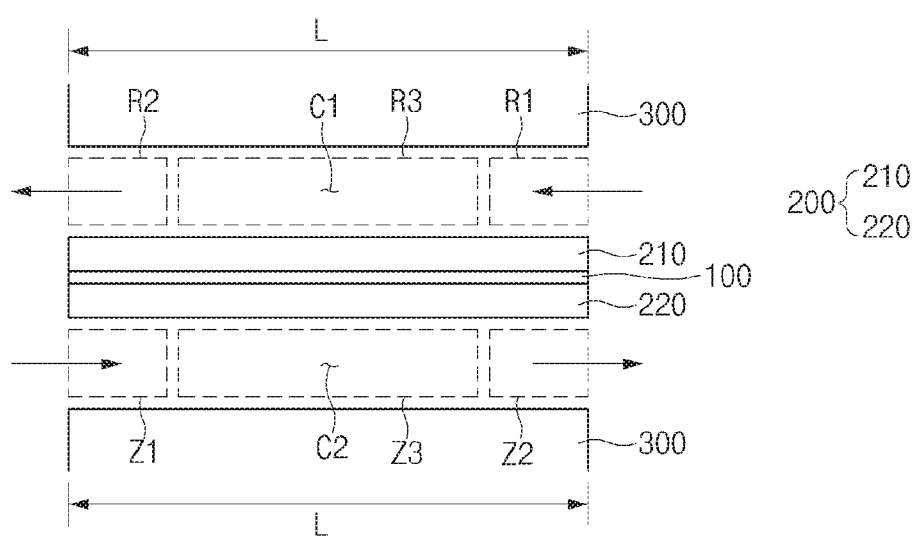
FIG. 1 is a schematic side view illustrating a structure of a fuel cell according to embodiments of the present disclosure.

As illustrated in FIG. 1, a fuel cell 10 according to embodiments of the present disclosure may include a membrane electrode assembly (MEA) 100 including a membrane, a cathode, and an anode. The MEA 100 may be configured to generate current by an electrochemical reaction between oxygen within air and a fuel (for example, hydrogen) supplied. For example, in the MEA 100, a hydrogen gas may be divided into hydrogen ions and electrons. Here, the hydrogen ions may move to the cathode via the membrane, and the electrons may move to the cathode via a separate path. The hydrogen ions and electrons having moved to the cathode may be reacted with oxygen to produce water. Here, referring to FIG. 1, the cathode may be provided above the MEA 100, and the anode may be provided below the MEA 100. Also, the membrane may be provided between the cathode and the anode.

The fuel cell 10 may further include gas diffusion layers 200, each of which is stacked on an outer surface of the cathode provided in the MEA 100 and an outer surface of the anode provided in the MEA 100. More specifically, the gas diffusion layers 200 may include a cathode-gas diffusion layer 210 stacked on the outer surface of the cathode provided in the MEA 100 and an anode-gas diffusion layer 220 stacked on the outer surface of the anode provided in the MEA 100. FIG. 1 illustrates that the cathode-gas diffusion layer 210 is stacked on the top surface of the MEA 100 and the anode-gas diffusion layer 220 is stacked on the bottom surface of the MEA 100.

Also, the fuel cell 10 may include separators 300 stacked on surfaces of the gas diffusion layer 200. That is, the separators 300 may be stacked on each of the outer surface (the top surface in FIG. 1) of the cathode-gas diffusion layer 210 and the outer surface (the bottom surface in FIG. 1) of the anode-gas diffusion layer 220.

Thus, the fuel cell 10 may have a structure in which the separator 300, the cathode-gas diffusion layer 210, the MEA 100, and the anode-gas diffusion layer 220 are repeatedly arranged in this order.

Referring to FIG. 1 again, each of an air channel C1 serving as a path through which air flows and a fuel channel C2 serving as a path through which a fuel flows may be provided in the separator 300 of the fuel cell 10 according to embodiments of the present disclosure. According to embodiments of the present disclosure, the air supplied to the separator 300 via the air channel C1 may be supplied to the MEA 100 via the cathode-gas diffusion layer 210, and the fuel supplied to the separator 300 via the fuel channel C2 may be supplied to the MEA 100 via the anode-gas diffusion layer 220.

In the specification, the gas and fuel supplied to the fuel cell 10 according to embodiments of the present disclosure may be referred to as a reaction gas, and the air channel C1 and the fuel channel C2 may be referred to as a reaction gas channel. That is, in the specification, the reaction gas may be referred to as the air or the fuel. And the reaction gas channel may be referred to as the air channel or the fuel channel.

In the fuel cell 10, the separator 300 may have a predetermined length. In FIG. 1, the overall length of the separator 300 may be denoted as a reference symbol L. Also, the air channel C1 and the fuel channel C2 may be provided extending along the overall length L of the separator 300. However, unlike the above, the air channel C1 may be provided extending along the overall length L of the separator 300, but the fuel channel C2 may be provided extending in a direction crossing the overall length L of the separator 300. That is, the air channel C1 and the fuel channel C2 may cross each other.

Also, the reaction gas channels C1 and C2 of the separator 300 may be divided into a plurality of regions. For example, with respect to a flow direction of the air flowing through the air channel C1, the air channel C1 may be divided into an inlet region R1 that is an upstream region, an outlet region R2 that is a downstream region, and a central region R3 that is provided between the inlet region R1 and the outlet region R2. Also, with respect to a flow direction of the fuel flowing through the fuel channel C2, the fuel channel C2 may be divided into an inlet region Z1 that is an upstream region, an outlet region Z2 that is a downstream region, and a central region Z3 that is provided between the inlet region Z1 and the outlet region Z2.

As described above, the air supplied to the separator 300 via the air channel C1 of the separator 300 may be supplied to the MEA 100 via the cathode-gas diffusion layer 210, and the fuel supplied to the separator 300 via the fuel channel C2 may be supplied to the MEA 100 via the anode-gas diffusion layer 220. Here, the inlet region R1 that is the upstream region in the air channel C1 has a high oxygen concentration, and the outlet region R2 that is the downstream region in the air channel C1 has a high temperature due to electrochemical reactions occurring in the vicinities of the inlet region R1 and the central region R3. Also, the inlet region Z1 that is the upstream region in the fuel channel C2 has a high hydrogen concentration, and the outlet region Z2 that is the downstream region in the fuel channel C2 has a high temperature due to electrochemical reactions occurring in the vicinities of the inlet region Z1 and the central region Z3.

The electrochemical reaction generated in the fuel cell by the hydrogen and fuel occurs actively when (i) the concentration of oxygen or fuel becomes high, and (ii) the activity of a catalyst involved in the electrochemical reaction becomes high due to the high temperature in a region in which the electrochemical reaction occurs. Thus, in the fuel cell, the electrochemical reaction generated by the reaction gas occurs more actively in a region adjacent to the inlet regions R1 and Z1 or the outlet regions R2 and Z2 than in regions adjacent to the central regions R3 and Z3.

The fact that the electrochemical reaction occurs actively indicates that sufficient current flows. Thus, according to the related art, current densities are not uniform in regions adjacent to the inlet region, the central region, and the outlet region of the reaction gas channel in the fuel cell. Particularly, the current density becomes excessively high in regions adjacent to the inlet region or the outlet region of the reaction gas channel, and in this case, degradation occurs around regions with high current density.

Embodiments of the present disclosure reduce the above degradation according to the related art.

To this end, according to an embodiment of the present disclosure, electric resistance of the separator 300 in the inlet region or the outlet region of the reaction gas channel may be greater than electric resistance of the separator 300 in the central region of the reaction gas channel. In this case, the densities of current around the inlet region or the outlet region of the reaction gas channel are reduced compared to in the related art, and thus, the densities of current in regions adjacent to the inlet region, the central region, and the outlet region of the reaction gas channel may become uniform.

On the other hand, according to another embodiment, electric resistance in a region of the gas diffusion layer 200 adjacent to the inlet region of the reaction gas channel or electric resistance in a region of the gas diffusion layer 200 adjacent to the outlet region of the reaction gas channel may be greater than electric resistance in a region of the gas diffusion layer 200 adjacent to the central region of the reaction gas channel. In this case, the densities of current around the inlet region or the outlet region of the reaction gas channel are also reduced compared to the related art, and thus, the densities of current in regions adjacent to the inlet region, the central region, and the outlet region of the reaction gas channel may become uniform.

The degradation of the fuel cell due to the non-uniformity of current densities occurring around the reaction gas channel in the fuel cell according to the related art mainly occurs in a region having a length equivalent to about 10% of the overall length of the separator in the inlet region and the outlet region of the reaction gas channel. Thus, according to embodiments of the present disclosure, each of the lengths of the inlet region and the outlet region in the reaction gas channel of the separator 300 may be about 8% to about 12% of the overall length L of the separator 300. In a case where each of the lengths of the inlet region and the outlet region in the reaction gas channel of the separator 300 is less than about 8% of the overall length L of the separator 300, the degradation of the fuel cell may not be effectively prevented. Also, in a case where each of the lengths of the inlet region and the outlet region in the reaction gas channel of the separator 300 exceeds about 12% of the overall length L of the separator 300, the electric resistance significantly increases in the inlet region and the outlet region in the reaction gas channel of the separator 300, and thus, an output of the fuel cell may also be significantly reduced. For example, each of the lengths of the inlet region and the outlet region in the reaction gas channel of the separator 300 may be about 10% of the overall length L of the separator 300.

Also, according to embodiments of the present disclosure, to remove the non-uniformity in current densities depending on the positions of the separator of the fuel cell, the electric resistance of the separator 300 in each of the inlet region and the outlet region of the reaction gas channel may be greater by about 8% to about 12% than the electric resistance of the separator 300 in the central region of the reaction gas channel.

In a case where the electric resistance of the separator 300 in each of the inlet region and the outlet region of the reaction gas channel is greater, by less than about 8%, than the electric resistance of the separator 300 in the central region of the reaction gas channel, the degradation of the fuel cell may not be effectively prevented. Also, in a case where the electric resistance of the separator 300 in each of the inlet region and the outlet region of the reaction gas channel is greater, by more than about 12%, than the electric resistance of the separator 300 in the central region of the reaction gas channel, the electric resistance significantly increases in the inlet region and the outlet region in the reaction gas channel of the separator 300, and thus, the output of the fuel cell may also be significantly reduced. For example, the electric resistance of the separator 300 in each of the inlet region or the outlet region of the reaction gas channel may be greater by about 10% than the electric resistance of the separator 300 in the central region of the reaction gas channel.

Also, according to embodiments of the present disclosure, to remove the non-uniformity in current densities depending on the positions of the separator of the fuel cell, each of the electric resistance in the region of the gas diffusion layer 200 adjacent to the inlet region of the reaction gas channel and the electric resistance in the region of the gas diffusion layer 200 adjacent to the outlet region of the reaction gas channel may be greater by about 8% to about 12% than the electric resistance in the region of the gas diffusion layer 200 adjacent to the central region of the reaction gas channel.

In a case where each of the electric resistance in the region of the gas diffusion layer 200 adjacent to the inlet region of the reaction gas channel and the electric resistance in the region of the gas diffusion layer 200 adjacent to the outlet region of the reaction gas channel is greater, by less than about 8%, than the electric resistance in the region of the gas diffusion layer 200 adjacent to the central region of the reaction gas channel, the degradation of the fuel cell may not be effectively prevented. In a case where each of the electric resistance in the region of the gas diffusion layer 200 adjacent to the inlet region of the reaction gas channel and the electric resistance in the region of the gas diffusion layer 200 adjacent to the outlet region of the reaction gas channel is greater, by more than about 12%, than the electric resistance in the region of the gas diffusion layer 200 adjacent to the central region of the reaction gas channel, the electric resistance significantly increases in the region of the gas diffusion layer 200 adjacent to the inlet region or the outlet region of the reaction gas channel, and thus, the output of the fuel cell may also be significantly reduced. For example, each of the electric resistance in the region of the gas diffusion layer 200 adjacent to the inlet region of the reaction gas channel and the electric resistance in the region of the gas diffusion layer 200 adjacent to the outlet region of the reaction gas channel may be greater by about 10% than the electric resistance in the region of the gas diffusion layer 200 adjacent to the central region of the reaction gas channel.

Hereinafter, with reference to the drawings, structures of fuel cells according to various exemplary embodiments of the present disclosure will be described in detail.

Figure 2:
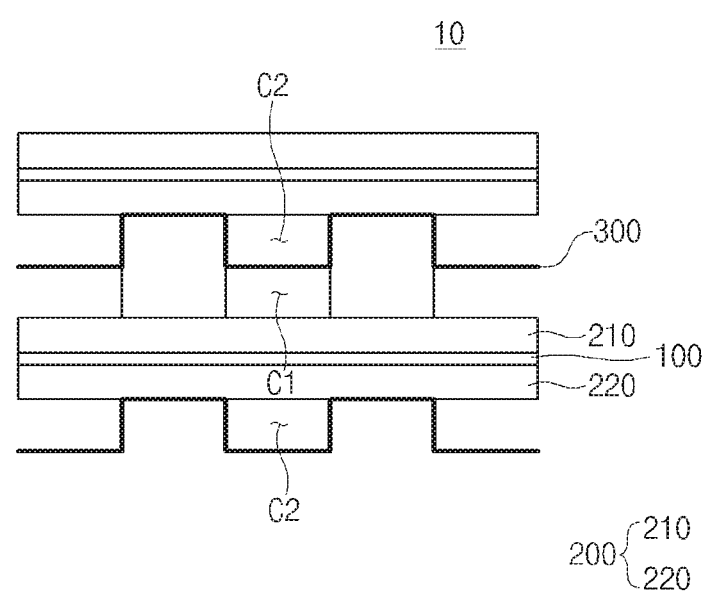
FIG. 2 is a vertical cross-sectional view illustrating a cross-sectional structure of an inlet region or an outlet region of a reaction gas channel in a fuel cell according to a first exemplary embodiment of the present disclosure.

FIG. 2 is a vertical cross-sectional view illustrating a cross-sectional structure of an inlet region or an outlet region of a reaction gas channel in a fuel cell according to a first exemplary embodiment of the present disclosure.

Referring to FIG. 2, according to the first exemplary embodiment of the present disclosure, a thickness of a separator 300 in the inlet region or the outlet region of a reaction gas channel of the separator 300 may be less than a thickness of the separator 300 in a central region of the reaction gas channel.

Current generated in an MEA 100 flows through the separator 300. The fact that the thickness of the separator 300 is small indicates that a path through which the current flows is narrow. Consequently, electric resistance of the separator 300 increases. Here, the thickness of the separator 300 may be small in the entire region of the inlet region or the outlet region of the reaction gas channel, but the thickness of the separator 300 may be small in only a partial region of the inlet region or outlet region of the reaction gas channel. Also, FIG. 2 illustrates that the thickness of the separator 300 is relatively small in an inlet region or an outlet region of an air channel C1 of the separator 300. However, the thickness of the separator 300 is relatively small in an inlet region or an outlet region of a fuel channel C2 of the separator 300.

Figure 3:
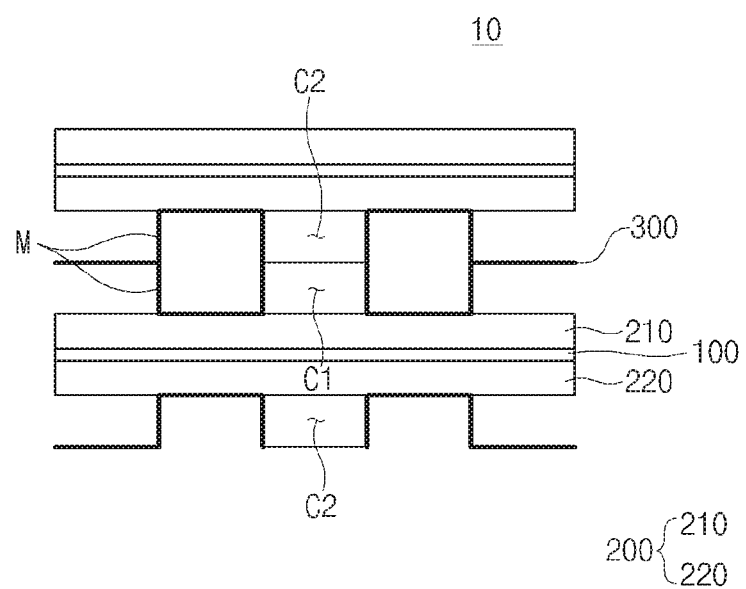
FIG. 3 is a vertical cross-sectional view illustrating a cross-sectional structure of an inlet region or an outlet region of a reaction gas channel in a fuel cell according to a second exemplary embodiment of the present disclosure.

FIG. 3 is a vertical cross-sectional view illustrating a cross-sectional structure of an inlet region or an outlet region of a reaction gas channel in a fuel cell according to a second exemplary embodiment of the present disclosure.

Referring to FIG. 3, according to the second exemplary embodiment of the present disclosure, a metal layer M may be provided on a surface of a separator 300 in a central region of a reaction gas channel of the separator 300, and the metal layer M may not be provided on at least a portion of a surface of the separator 300 in the inlet region or the outlet region of the reaction gas channel. For example, the metal layer M may be provided on the entire surface of the separator 300 in the central region of the reaction gas channel of the separator 300, and the metal layer M may not be provided on at least a portion of the surface of the separator 300 in the inlet region or the outlet region of the reaction gas channel. As described above, current generated in the MEA 100 flows through the separator 300. The current smoothly flows in the region of the separator 300 in which the metal layer M is provided, but the current does not smoothly flow in the region of the separator 300 in which the metal layer M is not provided. Thus, according to the second exemplary embodiment of the present disclosure, electric resistance in the inlet region or the outlet region of the reaction gas channel of the separator 300 becomes increased.

On the other hand, the metal layer M may not be provided on at least a portion of the surface of the separator 300 in the central region of the reaction gas channel of the separator 300. However, even in this case, a ratio of the region in which the metal layer M is provided with respect to the surface of the separator 300 in the central region of the reaction gas channel of the separator 300 may be greater than a ratio of the region in which the metal layer M is provided with respect to the surface of the separator 300 in the inlet region or the outlet region of the reaction gas channel of the separator 300. For reference, FIG. 3 illustrates a state in which the metal layer M is not provided on at least a portion of a surface of a region partitioning the separator 300 into an air channel C1 and a fuel channel C2.

Figure 4:
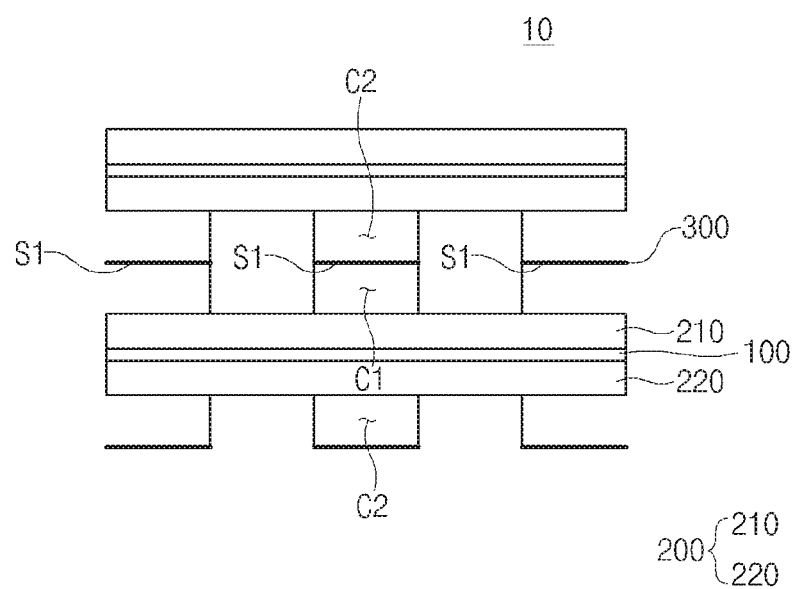
FIG. 4 is a vertical cross-sectional view illustrating a cross-sectional structure of an inlet region or an outlet region of a reaction gas channel in a fuel cell according to a third exemplary embodiment of the present disclosure.

FIG. 4 is a vertical cross-sectional view illustrating a cross-sectional structure of an inlet region or an outlet region of a reaction gas channel in a fuel cell according to a third exemplary embodiment of the present disclosure.

Referring to FIG. 4, according to the third exemplary embodiment of the present disclosure, an electrically insulating layer S1 may be provided on a surface of the separator 300 in the inlet region or the outlet region of the reaction gas channel of the separator 300. More preferably, the electrically insulating layer S1 may be provided on at least a portion of the surface of the separator 300 in the inlet region or the outlet region of the reaction gas channel of the separator 300. Current may not smoothly flow in a region in which the electrically insulating layer S1 is provided on the surface of the separator 300. Thus, electric resistance in the inlet region or the outlet region of the reaction gas channel of the separator 300 becomes increased.

On the other hand, the electrically insulating layer S1 may also be provided on at least a portion of the surface of the separator 300 in a central region of the reaction gas channel of the separator 300. However, even in this case, a ratio of the region in which the electrically insulating layer S1 is provided with respect to the surface of the separator 300 in the inlet region or the outlet region of the reaction gas channel of the separator 300 may be greater than a ratio of the region in which the electrically insulating layer S1 is provided with respect to the surface of the separator 300 in the central region of the reaction gas channel of the separator 300. For reference, FIG. 4 illustrates a state in which the electrically insulating layer S1 is provided on a surface of a region partitioning the separator 300 into an air channel C1 and a fuel channel C2.

Figure 5:
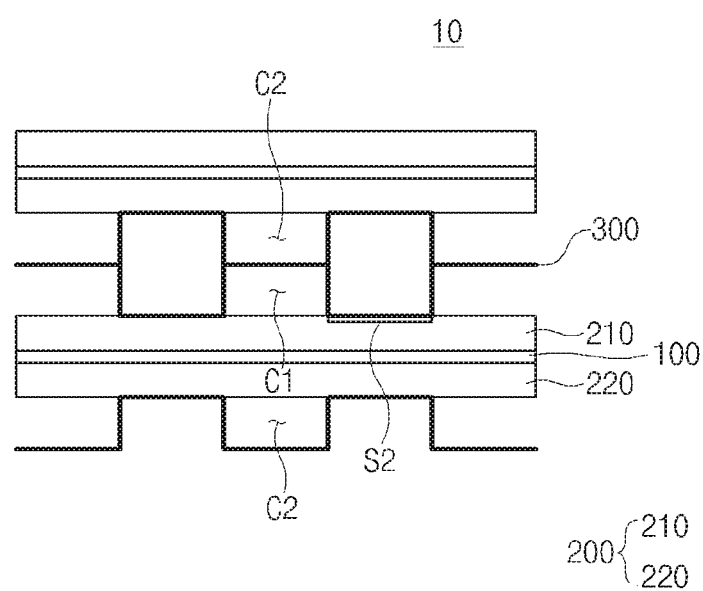
FIG. 5 is a vertical cross-sectional view illustrating a cross-sectional structure of an inlet region or an outlet region of a reaction gas channel in a fuel cell according to a fourth exemplary embodiment of the present disclosure.

FIG. 5 is a vertical cross-sectional view illustrating a cross-sectional structure of an inlet region or an outlet region of a reaction gas channel in a fuel cell according to a fourth exemplary embodiment of the present disclosure.

As illustrated in FIG. 5, according to the fourth exemplary embodiment of the present disclosure, an electrically insulating layer S2 may be provided on a surface of a region of a gas diffusion layer 200 adjacent to the inlet region of the reaction gas channel, or on a surface of a region of the gas diffusion layer 200 adjacent to the outlet region of the reaction gas channel. FIG. 5 illustrates a state in which the electrically insulating layer S2 is provided on a portion of a surface of a region of a cathode-gas diffusion layer 210 adjacent to an inlet region of an air channel C1, or a surface of a region of the cathode-gas diffusion layer 210 adjacent to an outlet region of the air channel C1. However, unlike the above, the electrically insulating layer S2 may be provided on a portion of a surface of a region of an anode-gas diffusion layer 220 adjacent to an inlet region of a fuel channel C2, or a surface of a region of the anode-gas diffusion layer 220 adjacent to an outlet region of the fuel channel C2.

The current generated in the MEA 100 flows to a separator 300 via a gas diffusion layer 200. In a case where the electrically insulating layer S2 is provided on a surface of the gas diffusion layer 200, the current may not smoothly flow through the region. Thus, the electric resistance of the gas diffusion layer 200 becomes increased in the region in which the electrically insulating layer S2 is provided.

Unlike the above, the electrically insulating layer S2 may also be provided on a surface of a region of the gas diffusion layer 200 adjacent to a central region of the reaction gas channel. However, even in this case, a ratio of the region in which the electrically insulating layer S2 is provided with respect to the surface of the region of the gas diffusion layer 200 adjacent to the inlet region of the reaction gas channel, or the surface of the region of the gas diffusion layer 200 adjacent to the outlet region of the reaction gas channel, may be greater than a ratio of the region in which the electrically insulating layer S2 is provided with respect to the surface of the region of the gas diffusion layer 200 adjacent to the central region of the reaction gas channel.

Figure 6:
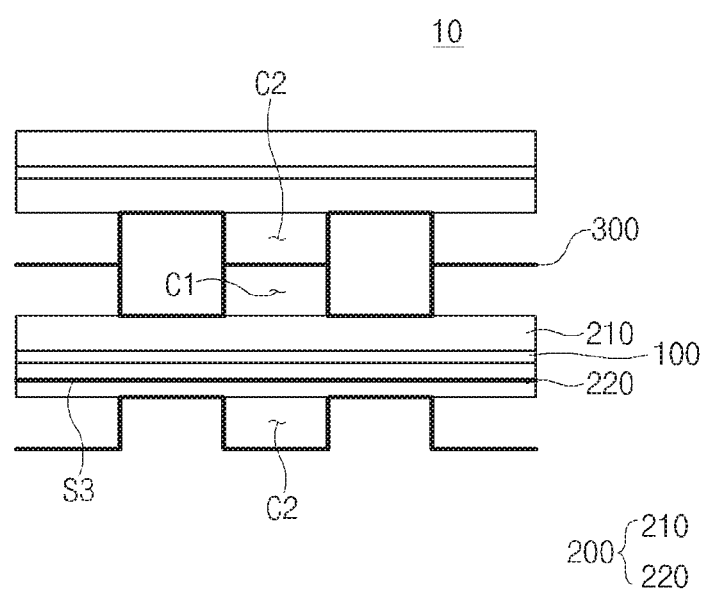
FIG. 6 is a vertical cross-sectional view illustrating a cross-sectional structure of an inlet region or an outlet region of a reaction gas channel in a fuel cell according to a fifth exemplary embodiment of the present disclosure.

FIG. 6 is a vertical cross-sectional view illustrating a cross-sectional structure of an inlet region or an outlet region of a reaction gas channel in a fuel cell according to a fifth exemplary embodiment of the present disclosure.

As illustrated in FIG. 6, according to the fifth exemplary embodiment of the present disclosure, an electrically insulating layer S3 may be provided within a region of a gas diffusion layer 200 adjacent to the inlet region of the reaction gas channel, or within a region of the gas diffusion layer 200 adjacent to the outlet region of the reaction gas channel. FIG. 6 illustrates a state in which the electrically insulating layer S3 is be provided within a region of an anode-gas diffusion layer 220 adjacent to an inlet region of a fuel channel C2, or within a region of the anode-gas diffusion layer 220 adjacent to an outlet region of the fuel channel C2. However, unlike the above, the electrically insulating layer S3 may also be provided within a region of a cathode-gas diffusion layer 210 adjacent to an inlet region of an air channel C1, or within a region of the cathode-gas diffusion layer 210 adjacent to an outlet region of the air channel C1.

As described above, the current generated in the MEA 100 flows to a separator 300 via a gas diffusion layer 200. In a case where the electrically insulating layer S3 is provided within the gas diffusion layer 200, the current may not smoothly flow through the region. Thus, the electric resistance of the gas diffusion layer 200 becomes increased in the region in which the electrically insulating layer S3 is provided.

Unlike the above, the electrically insulating layer S3 may also be provided within a region of the gas diffusion layer 200 adjacent to a central region of the reaction gas channel. However, even in this case, a ratio of the region in which the electrically insulating layer S3 is provided with respect to the inside of the region of the gas diffusion layer 200 adjacent to the inlet region of the reaction gas channel, or the inside of the region of the gas diffusion layer 200 adjacent to the outlet region of the reaction gas channel, may be greater than a ratio of the region in which the electrically insulating layer S3 is provided with respect to the inside of the region of the gas diffusion layer 200 adjacent to the central region of the reaction gas channel.

Also, the gas diffusion layer 200 may include a base layer having a sheet shape and a microporous layer stacked on one surface of the base layer. Here, the electrically insulating layer S3 according to the fifth exemplary embodiment of the present disclosure may be provided between the base layer and the microporous layer or provided within the base layer.

Also, as described above, the degradation of the fuel cell mentioned in the related art mainly occurs in the inlet region and the outlet region of the reaction gas channel. Among the inlet and outlet regions, the degradation occurs more frequently in the inlet region in which the concentration of the reaction gas (that is, the air and fuel) supplied to the separator is high.

Thus, according to embodiments of the present disclosure, to effectively prevent the degradation of the fuel cell from occurring around the inlet region of the reaction gas channel, the electric resistance of the separator 300 in the inlet region of the reaction gas channel may be greater than the electric resistance of the separator 300 in the outlet region of the reaction gas channel. Alternatively, the electric resistance in the region of the gas diffusion layer 200 adjacent to the inlet region of the reaction gas channel may be greater than the electric resistance in the region of the gas diffusion layer 200 adjacent to the outlet region of the reaction gas channel.

Also, the degradation of the fuel cell mentioned in the related art may occur more actively around a region in which, among reaction gases, the air flows. Thus, more preferably, among the air and the fuel, the reaction gas described above may be the air. Also, the reaction gas channel may be the air channel.

Automobile

An automobile according to embodiments of the present disclosure may be an automobile including a fuel cell. More preferably, the automobile according to embodiments of the present disclosure may be a hydrogen fuel cell automobile.

Here, referring to FIGS. 1 to 6, the fuel cell provided in the automobile according to embodiments of the present disclosure may include the MEA 100 including the membrane, the cathode, and the anode, the gas diffusion layers 200, each of which is stacked on an outer surface of the cathode and the outer surface of the anode of the MEA 100, respectively, and the separators 300 stacked on the outer surfaces of the gas diffusion layer 200, respectively. Also, each of the reaction gas channels C1 and C2, serving as the flow paths through which the reaction gas flows, may be provided in the separator 300. The reaction gas channels C1 and C2 may respectively include the inlet regions R1 and Z1, the outlet regions R2 and Z2, and the central regions R3 and Z3 provided between the inlet regions and the outlet regions, with respect to the flow direction of the reaction gas flowing through the reaction gas channels C1 and C2.

According to embodiments of the present disclosure, (i) the electric resistance of the separator 300 in the inlet regions R1 and Z1 or the outlet regions R2 and Z2 of the reaction gas channels C1 and C2 may be greater than the electric resistance of the separator 300 in the central regions R3 and Z3 of the reaction gas channels C1 and C2, or (ii) the electric resistance in the regions of the gas diffusion layer 200 adjacent to the inlet regions R1 and Z1 of the reaction gas channels C1 and C2, or the electric resistance in the regions of the gas diffusion layer 200 adjacent to the outlet regions R2 and Z2 of the reaction gas channels C1 and C2, may be greater than the electric resistance in the regions of the gas diffusion layer 200 adjacent to the central regions R3 and Z3 of the reaction gas channels C1 and C2.

According to the exemplary embodiments of the present disclosure, the non-uniformity in current densities according to positions of the fuel cell may be reduced to manufacture the fuel cell having uniform performance.

Although the present disclosure is described by specific embodiments and drawings as described above, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A fuel cell comprising:
   a membrane electrode assembly (MEA) comprising a membrane, a cathode, and an anode;
   a first gas diffusion layer stacked on an outer surface of the cathode of the MEA;
   a second gas diffusion layer stacked on an outer surface of the anode of the MEA;
   a separator stacked on an outer surface of the first gas diffusion layer;
   a reaction gas channel provided in the separator, the reaction gas channel configured to serve as a path through which a reaction gas flows, wherein:
   the reaction gas channel comprises an inlet region, an outlet region, and a central region provided between the inlet region and the outlet region with respect to a flow direction of the reaction gas flowing through the reaction gas channel, and
   an electric resistance of the separator in the inlet region or the outlet region of the reaction gas channel is greater than an electric resistance of the separator in the central region of the reaction gas channel; and
   a metal layer provided on a surface of the separator in the central region of the reaction gas channel, wherein the metal layer is not provided on at least a portion of a surface of the separator in the inlet region or the outlet region of the reaction gas channel.

2. The fuel cell of claim 1, wherein each of the inlet region and the outlet region is 8% to 12% of an overall length of the separator.

3. The fuel cell of claim 1, wherein each of the electric resistance of the separator in the inlet region and the electric resistance in the outlet region of the reaction gas channel is greater by 8% to 12% than the electric resistance of the separator in the central region of the reaction gas channel.

4. The fuel cell of claim 1, wherein a thickness of the separator in the inlet region of the reaction gas channel or a thickness of the separator in the outlet region of the reaction gas channel is less than a thickness of the separator in the central region of the reaction gas channel.

5. The fuel cell of claim 1, further comprising an electrically insulating layer provided on a surface of the separator in the inlet region or the outlet region of the reaction gas channel.

6. The fuel cell of claim 1, wherein the reaction gas is air, and wherein the reaction gas channel is an air channel.

7. An automobile comprising the fuel cell of claim 1.

8. A fuel cell comprising:
   a membrane electrode assembly (MEA) comprising a membrane, a cathode, and an anode;
   a first gas diffusion layer stacked on an outer surface of the cathode of the MEA;
   a second gas diffusion layer stacked on an outer surface of the anode of the MEA;
   a separator stacked on an outer surface of the first gas diffusion layer; and
   a reaction gas channel provided in the separator, the reaction gas channel configured to serve as a path through which a reaction gas flows, wherein:
   the reaction gas channel comprises an inlet region, an outlet region, and a central region provided between the inlet region and the outlet region with respect to a flow direction of the reaction gas flowing through the reaction gas channel,
   an electric resistance of the separator in the inlet region or the outlet region of the reaction gas channel is greater than an electric resistance of the separator in the central region of the reaction gas channel, and
   the electric resistance of the separator in the inlet region of the reaction gas channel is greater than the electric resistance of the separator in the outlet region of the reaction gas channel.

9. The fuel cell of claim 8, wherein each of the inlet region and the outlet region is 8% to 12% of an overall length of the separator.

10. The fuel cell of claim 8, wherein each of the electric resistance of the separator in the inlet region and the electric resistance in the outlet region of the reaction gas channel is greater by 8% to 12% than the electric resistance of the separator in the central region of the reaction gas channel.

11. The fuel cell of claim 8, wherein a thickness of the separator in the inlet region of the reaction gas channel or a thickness of the separator in the outlet region of the reaction gas channel is less than a thickness of the separator in the central region of the reaction gas channel.

12. The fuel cell of claim 8, further comprising an electrically insulating layer provided on a surface of the separator in the inlet region or the outlet region of the reaction gas channel.

13. An automobile comprising the fuel cell of claim 8.

* * * * *